United States Patent [19]

Iler et al.

[11] 4,399,109
[45] Aug. 16, 1983

[54] CONTROL OF SILICA SCALING DURING ACID LEACHING OF LATERITIC ORE

[75] Inventors: Ralph K. Iler, Wilmington, Del.; Paul B. Queneau, Golden; Mark W. Cooperrider, Arvada, both of Colo.

[73] Assignee: Compagnie Francaise d'Entreprises Minieres, Metallurgiques et d'Investissements, Paris, France

[21] Appl. No.: 352,537

[22] Filed: Feb. 26, 1982

[51] Int. Cl.³ .................... C22B 3/00; C01G 53/11
[52] U.S. Cl. .......................... 423/141; 423/150; 203/7
[58] Field of Search ............. 75/119, 101 R; 423/150, 423/141, 145, 146; 252/80; 203/7; 134/3, 41

[56] References Cited

U.S. PATENT DOCUMENTS

| | | | |
|---|---|---|---|
| 3,734,835 | 5/1973 | Spicacci | 203/7 |
| 3,991,159 | 11/1976 | Queneau et al. | 423/150 |
| 4,044,096 | 8/1977 | Queneau et al. | 423/150 |
| 4,098,870 | 7/1978 | Fekete et al. | 423/150 |
| 4,247,371 | 1/1981 | Roller | 203/7 |

Primary Examiner—O. R. Vertiz
Assistant Examiner—Robert L. Stoll

Attorney, Agent, or Firm—Michael A. Ciomek; Eugene J. Kalil

[57] ABSTRACT

A method is provided for inhibiting the formation of silica scale on flash-pot surfaces during the multi-stage flashing of sulfuric acid pressure-leach slurry obtained following the continuous autoclave leaching of nickel lateritic ore at elevated temperature and pressure during which silica is dissolved, wherein the leach slurry is subjected to a high-temperature flash stage such that the slurry at the flash temperature is supersaturated in soluble silica, and wherein the slurry is thereafter subjected to at least one additional flash at an intermediate-temperature flash stage at which silica precipitates and tends to form a scale accompanied by a decrease in said supersaturation. The improvement resides in recycling a substantial portion of the slurry to the intermediate-temperature stage following flashing to the intermediate-temperature flash stage, the portion recycled being sufficient to effect a dilution in silica concentration of the slurry being flashed into the intermediate-temperature flash stage from the high-temperature stage, and continuing the recycling of flashed slurry to the intermediate-temperature flash stage, whereby silica scale formation at the intermediate-temperature flash stage is greatly inhibited. The pH of the recycling stream may be adjusted to further minimize silica deposition.

10 Claims, 3 Drawing Figures

CONTROL OF SILICA SCALING DURING ACID LEACHING OF LATERITIC ORE

This invention relates to the leaching of nickeliferous oxide ores and, in particular, to the control of silica scaling on flash-pot surfaces during the multi-stage flashing of leach slurries from the pressure leach circuit.

STATE OF THE PRIOR ART

Methods are known to recover nickel and cobalt from lateritic ores. One method, which is referred to as the Moa Bay process, comprises pulping the nickel ore (95% passing 325 mesh) to approximately 40% solids, and then selectively leaching the nickel and cobalt with sulfuric acid at elevated temperature and pressure (e.g., 475° F. [245° C.] and 525 psig) to solubilize about 95% each of the nickel and cobalt. The leached pulp is cooled and then washed by countercurrent decantation, with the washed pulp going to tailings. The acid pH, which is quite low, is then neutralized with coral mud to a pH of about 2.5 to 2.8 and the thus-treated product liquor (containing generally about 4 to 6 grams of nickel per liter) is subjected to sulfide precipitation by preheating the leach liquor and carrying out the precipitation with $H_2S$ in an autoclave at about 250° F. (121° C.) and a pressure of about 150 psig. Usually, nickel sulfide seed is added at the feed end to assure substantially complete precipitation of the nickel and cobalt.

After the sulfide precipitate has been washed and thickened to about 65% solids, it is oxidized in an autoclave at about 350° F. (177° C.) and a pressure of about 700 psig. The solution of solubilized nickel and cobalt is neutralized with ammonia to a pH (5.35) sufficient to precipitate any iron, aluminum and chromium present using air as an oxidant, the precipitate being thereafter separated from the solution. The nickel and cobalt solution is thereafter adjusted in pH to about 1.5 and $H_2S$ added to selectively precipitate any copper, lead and zinc present, which precipitate is separated from the solution by filtration. The nickel is then selectively recovered from the solution by various methods, one particular method comprising treating the solution in an autoclave with hydrogen at a pressure of about 650 psig at a temperature of about 375° F. (245° C.), using nickel powder as seed material.

Pregnant liquor generated in the aforementioned Moa Bay-type leaching of nickel laterite may contain about 30 gpl (grams per liter) of free sulfuric acid, 2 gpl of aluminum and 1 gpl iron. A typical Moa Bay-type leach is one in which the ore is leached at 240°–260° C. at an acid ($H_2SO_4$) to ore ratio between 0.22 and 0.26 and a pulp density of 33%. Many of the refining processes available for the recovery of nickel from the foregoing solution operate most effectively at lower concentrations of acids, iron and aluminum. A typical Moa Bay ore is one containing 1.35% nickel, 0.14% Co. 0.9% Mn, 0.02% Cu, 0.04% Zn, 47% Fe, 10% $Al_2O_3$, 1% MgO and 39.55 of other constituents and water of hydration.

The amount of acid employed to leach the nickel ore is generally in substantial excess of the stoichiometric amount necessary because of the presence of substantial amounts of acid-consuming constituents in the ore, such as magnesium, aluminum, iron and the like. Generally, the pH of the pregnant liquor is quite low (typically 0.5 to 0.7) and, in order to adjust it for the sulfide precipitation of the nickel and cobalt values, an alkaline agent is added, e.g., coral mud, a strong base and the like, which imposes economic disadvantages on the process. The use of a strong base as a neutralizer tends to cause co-precipitation of nickel which should be avoided.

It is known to adjust the pH of a pregnant liquor by mixing a magnesium-containing lateritic ore with a leached pulp and its pregnant liquor and subjecting the mixture to high-temperature neutralization (acid kill) at an elevated temperature in the range of about 225° C. to 300° C. whereby the pregnant liquor of the leached pulp is neutralized and the magnesium-containing ore simultaneously leached to form a final pregnant liquor. One embodiment of this technique is described in U.S. Pat. No. 3,991,159, the disclosure of which is incorporated herein by reference.

PROBLEM CONFRONTING THE ART

In the sulfuric acid leaching of laterites at elevated temperature and pressure, e.g., 270° C. and about 800 psig, silica as quartz is generally soluble to a saturation level of about 500 to 600 ppm. However, even more silica tends to dissolve from amorphous silica liberated from silicate minerals by the acid. Thus, at 270° C. this silica is soluble to a relatively high level of 1250–1500 ppm.

In the high-pressure leaching of lateritic ores, the leached pulp is subsequently subjected to flashing to bring it to atmospheric conditions for the purpose of separating the undissolved solids from the pregnant liquor by countercurrent decantation (CCD). At least two stages of slurry let-down are employed to carry out this phase of the process. A problem that arises at the intermediate temperature following high-temperature supersaturation is the tendency for silica to precipitate and coat the inside surface of the flash pots and particularly the steam separators, especially at intermediate temperature.

It would be desirable to control or inhibit the formation of silica coating on flash-pot and steam-separator surfaces when going from a higher temperature stage to a lower temperature stage.

OBJECTS OF THE INVENTION

Thus, an object of the invention is to control silica scaling during acid leaching of laterite ore.

Another object is to provide a process wherein a portion of the leach pulp or slurry flashed at an intermediate stage is employed as recycle material back to said intermediate-temperature or other lower-temperature flash stage to inhibit silica scaling therein by mixing with or diluting the high-temperature leach pulp flowing into the intermediate or other flash stage.

These and other objects will more clearly appear when taken in conjunction with the following disclosure, claims and the drawing, wherein:

STATEMENT OF THE INVENTION

Figure 1:
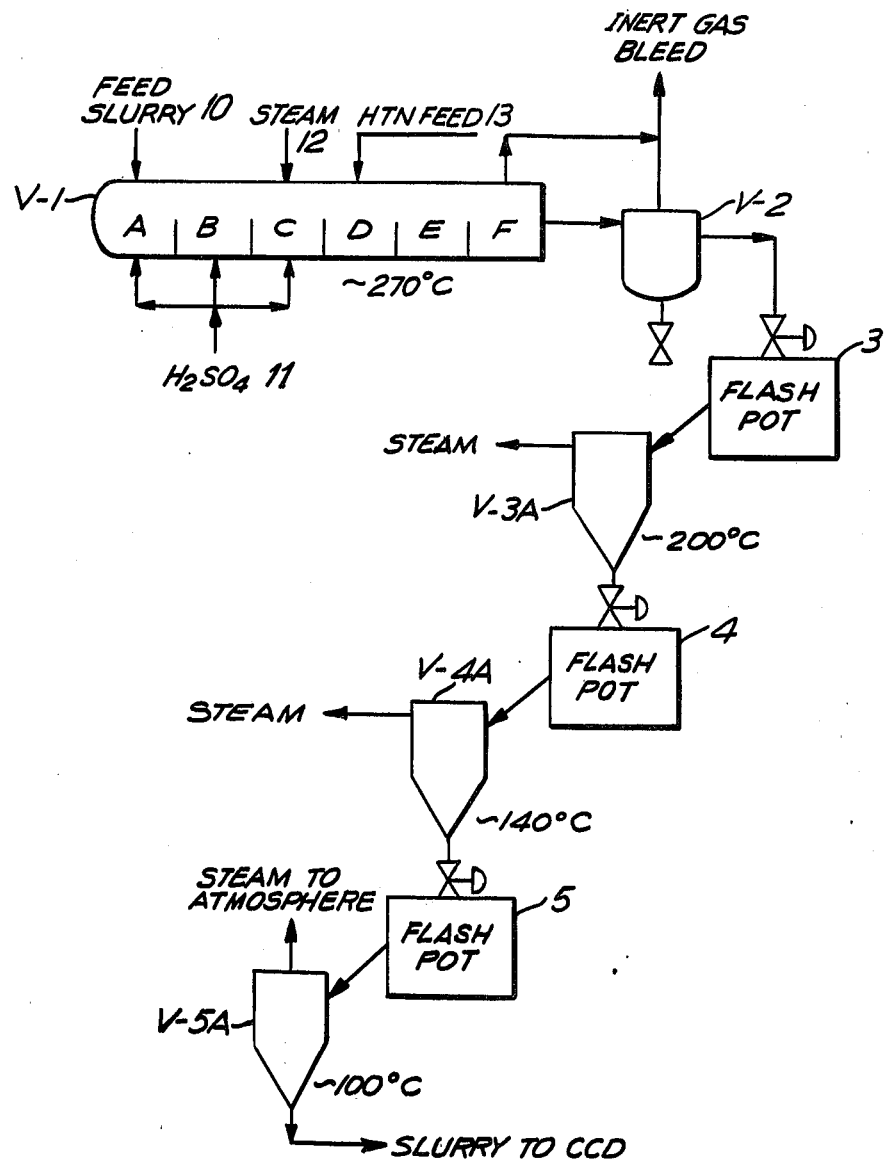
FIG. 1 is a flow sheet of a typical autoclave leaching system showing several flash stages.

Stating it broadly, a method is provided for inhibiting the formation of silica scale on flash-pot surfaces during the multi-stage flashing of sulfuric acid pressure-leach slurry obtained following the continuous autoclave leaching of nickel lateritic core at elevated temperature and pressure during which silica is dissolved. The leach slurry is subjected to at least one high-temperature flash stage such that the slurry at the said flash temperature is supersaturated in silica, following which the slurry is thereafter subjected to at least one additional flash at a lower- or intermediate-temperature flash stage at which silica scale precipitates and tends to form a scale accompanied by a decrease in said supersaturation.

The term "lower or intermediate temperature" is defined as that temperature which lies between the temperature of the slurry leaving the autoclave and the final temperature of the discharge slurry following the last flash stage.

One improvement resides in recycling a substantial portion of the slurry following flashing to the intermediate-temperature stage back to said intermediate-temperature flash stage, the portion recycled being sufficient to effect a dilution in silica solution concentration and thereby decrease the supersaturation of the high-temperature slurry fed to the intermediate-temperature flash stage. The multi-stage flashing is continued, including the recycling of the slurry to the intermediate-temperature flash, whereby silica scale formation at the intermediate-temperature flash stage is greatly inhibited. The recycling not only effects a dilution of the silica concentration, but also provides a greater surface area of solids upon which the soluble silica is deposited rather than upon the vessel wall.

For the purpose of this invention, there may be several intermediate-temperature flash stages in which each succeeding stage has a lower intermediate temperature than the preceding stage, so long as these temperatures are intermediate relative to the autoclave temperature and to the slurry discharge temperature. The recycling of slurry may be employed at one or more flash stages, depending upon the results to be achieved.

Thus, in carrying out the invention, it may be advantageous to employ a hold-tank for the slurry following flashing at an intermediate-temperature flash stage, especially in situations where silica precipitation still occurs after dilution, although it occurs more slowly. The hold-tank enables the storage of the recycle slurry for a sufficient time to take advantage of the lower rate of silica precipitation and enable the silica concentration to approach equilibrium.

Thus, by employing a hold-tank in the system, a stream having lower silica concentration is provided for the next succeeding flash stage.

For example, if a flash stage is particularly troublesome with respect to the formation of a silica coating, the tendency to coat the walls at that stage can be greatly reduced by recycling the stream at a previous stage and thereby reduce the silica concentration of the stream fed to the more troublesome stage.

The reason why slurry recycling at one or more of the intermediate stages decreases scaling is that: (a) the recycle slurry contains undissolved particles which provide, as stated hereinabove, additional active sites to promote precipitation of silica on these sites rather than on the walls of the flash pots, and (b) the second reason is due to the decrease in rate of silica deposition because of the reduced supersaturation of silica. Because of this reduced rate, it is preferred to use a hold-tank to allow sufficient time for the silica concentration to approach equilibrium.

It has been noted that where there is rapid precipitation of numerous fine particles of silica, the particles next to the walls of the flash pot tend to cement onto and adhere to the walls; whereas, where the precipitation of silica is controlled to a slower rate, fewer particles of a larger size are obtained in the body of the slurry which have a much lower tendency to cement onto the walls and thereby be subsequently available for recycle and for increasing the amount of active seed as discussed in (a) above.

In summary, the following advantages accrue: (1) the recycling of the slurry with respect to a selected flash stage aids in improving the efficiency of the succeeding flash stage; (2) the presence of the additional active amorphous silica particles in the recycle stream further enhances the collection of precipitating silica on the surface of the active seed; and (3) a further benefit is obtained by decreasing the absolute rate of silica precipitation as discussed hereinabove.

Another improvement provided by the invention for reducing scaling resides in controlling the pH in the range of about 1 to 2 when reducing the supersaturation factor of the stream entering the flash pot or the lower temperature stream-separator vessel.

Thus, by controlling the pH, one has an additional degree of freedom for controlling the rate of silica polymerization. A lower pH value in the lower portion of the range will tend to give higher polymerization rates and, therefore, would tend to require more slurry recycle to decrease silica supersaturation sufficiently to maintain a reasonably low rate of silica precipitation. Conversely, increasing the pH to about 2 will result in a sharp decrease in the rate of silica polymerization. Thus, one may operate with a higher level of silica supersaturation, while obtaining an acceptably low rate of silica precipitation.

DETAILS OF THE INVENTION

A typical high-pressure leach system for the leaching of nickel laterite ore is shown in the flow sheet of FIG. 1, the system comprising an autoclave V-1 containing a plurality of compartments A to F. A feed slurry 10 is fed at the compartment A end of the autoclave with sulfuric acid 11 directed to compartments A, B, and C with the slurry flowing from A to F. Steam 12 is fed as shown and, if necessary, high-temperature neutralization feed (HTN) 13 of, for example, garnierite, to control the pH during high-pressure leaching which is carried out at about 270° C. and a pressure of about 800 psig. As will be appreciated, the ore and acid feed locations can be varied in carrying out the process.

Following leaching, the leached slurry is passed to vessel V-2 to provide level control and to complete the bleed-off of inert gas, following which the leached slurry is passed to flash pot 3, the temperature at this point being in the neighborhood of about 200° C. The flashed slurry is fed to separator vessel V-3A where steam is removed for re-use in the leaching plant and the slurry flashed again in flash pot 4 to an intermediate temperature of about 140° C. from which the slurry then flows to separator vessel V-4A for separating the steam therefrom for re-use in the plant. The slurry is further flashed at flash pot 5 to the relatively low temperature of about 100° C. and passed from there to steam-separator vessel V-5A. Thereafter, the slurry is sent to countercurrent decantation (CCD) where the pregnant liquor is separated from the undissolved solids.

As stated hereinbefore, the problem of silica coating of the vessels occurs at the lower temperature range. A major site is vessel V-4A where the temperature is 140° C. However, this is relative, depending upon the autoclave temperature. For example, if the autoclave is operated at a higher temperature of about 300° C., the concentration of soluble silica would be higher; and thus, much more would show up in flash pot 3 and separator V-3A and present silica scale problems even at 200° C.

Referring to the flow sheet, not much silica is deposited in the first stage 3 and 3A where the temperature is still 200° C. At this temperature, the solubility of amorphous silica is still 800 ppm while there are present 1250–1500 ppm. Thus, the solution is supersaturated by a factor of only 1.5 to 1.9. Under the low pH condition and short hold-up time, this supersaturation is not enough to allow much nucleation of colloidal silica particles that must be formed before appreciable deposition can occur. (The supersaturation factor is the ratio of the silica concentration divided by the solubility of silica under the same conditions.)

However, there is some deposition of $MgSO_4 \cdot H_2O$ which is relatively insoluble at that high temperature and forms a scale trapping some $Fe_2O_3$. The magnesium sulfate dissolves in water at ordinary temperature.

There is little scaling in flash pot 4 because there is a strong scouring action. However, there is heavy scaling in V-4A, the steam separator. At this stage, the temperature has dropped to 140° C., and the solubility of silica is about 500 ppm. Since the supersaturation concentration of silica is 1200 to 1500 ppm, this calculates to a supersaturation factor of 2.4 to 3.0.

Hydrothermal studies have shown that this degree of supersaturation is sufficient to permit rapid nucleation of the solid amorphous phase as colloidal particles. The best data found on nucleation is that developed by Oleh Weres, Andrew Yee and Leon Tsao, Report LBL-7033, UC-4, "Kinetics of Silica Polymerization," May, 1980, Earth Sciences Division, Berkeley Laboratory, University of California, Berkeley, Calif. 94720 (Dept. of Energy Contract W-7405-ENG-48).

Nucleation at pH 0.5 may be slower than at pH 5.7 according to the Weres et al article. This pH was the lowest studied. On page 128 of the report, the data on nucleation at 150° C. shows that nucleation occurs in about 0.1 minute when the saturation ratio is 1.8, but only after 10 minutes when the ratio is 1.4. Thus, the marked effect of the degree of supersaturation is clearly apparent.

Other observations have indicated that nucleation and particle growth (and also deposition on surfaces) appear to be more rapid at pH 0.5 than at pH 1.4–2.0. This increased scaling at the lower pH levels indicates that it may be likely that scaling might be reduced if the supersaturation factor is reduced and the pH controlled to about 1.7 (for example, from about 1 to 2).

It appeared that since the rate of silica deposition depends to some degree on the extent of supersaturation in the aqueous phase, then it was conjectured that nucleation and deposition of silica could possibly be inhibited by reducing the supersaturation factor of the stream entering separator vessel V-4A. Also, since the rate of nucleation and deposition should be a minimum at about pH 1.7, then raising the pH of the stream to about 2 as it is flashed into flash pot 4 may reduce scaling.

Since the stream leaving the intermediate-temperature stage (140° C.) will have been somewhat relieved of its supersaturation, then recycling a portion of the stream to flash pot 4 to be mixed with the flashed stream entering the flash pot from separator V-3A should reduce supersaturation sufficiently to inhibit silica scaling at intermediate-temperature stage V-4A.

Figure 2:
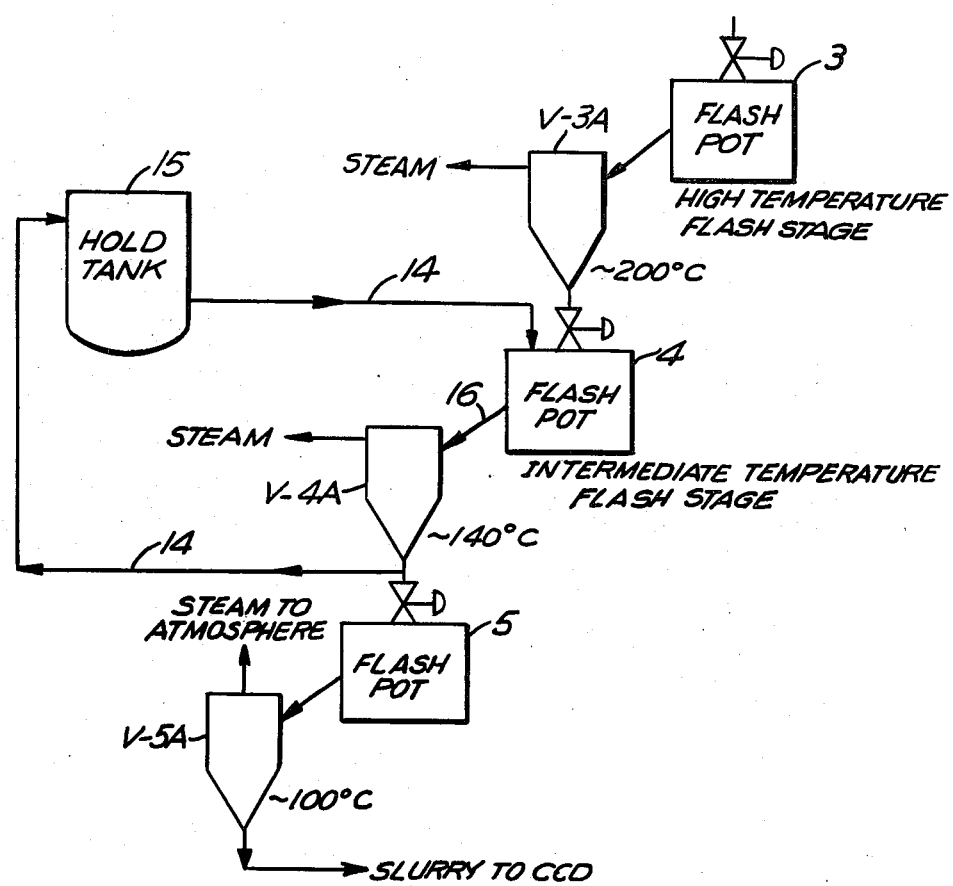
FIG. 2 is a portion of the leach flow sheet of FIG. 1 illustrating the application of the invention.

This concept is shown in FIG. 2, which depicts only that part of the flash circuit for illustrating the invention. Slurry 14 is drawn from the discharge end of separator V-4A and stored in hold-tank 15 from where it is recycled to flash pot 4 to be mixed with flashed slurry from V-3A entering the flash pot and provide a blend 16 of lower supersaturation entering separator V-4A.

The dilution effect which can be achieved by the recycling concept will clearly appear from the following derived formula, reference being made to FIG. 2:

(a) F is the mass flow rate of the stream of supersaturated silica entering flash pot 4 and $S_F$ is the supersaturation ratio in said stream.

(b) $C_F$ is the concentration of soluble silica in stream F, and C is the equilibrium solubility concentration of dissolved silica in recirculated stream through flash pot 4, separator vessel V-4A, and hold-tank 15.

It is assumed that in V-4A there are colloidal silica particles being circulated and there is time for supersaturated silica to deposit on recirculated colloidal particles so that the concentration of soluble silica is reduced and approaches equilibrium solubility C.

(c) The recirculation flow rate is R and that leaving flash pot 4 is a flow rate of F+R.

The total silica leaving the flash pot is $FC_F + RC$.

(d) The concentration of silica from flash pot 4 entering separator vessel V-4A is:

$$\frac{FC_F + RC}{F + R} = \frac{weight}{volume}$$

(e) Supersaturation ratio in separator V-4A is $S_{V-4A}$ which equals $$\frac{actual\ conc.}{solubility\ conc.} = \frac{(FC_F + RC)}{(F + R)} \div C \text{ or}$$

$$S_{V-4A} = \frac{FC_FC^{-1} + R}{F + R}$$

(f) Since $S_F$ is the supersaturation ratio in the stream entering flash pot 4, $$\text{then } S_F = C_FC^{-1} \text{ and } S_{V-4A} = \frac{(FS_F + R)}{(F + R)}$$

EXAMPLE

Assuming the supersaturation ratio in flash stream F (flash pot 4) is $S_F = 3$ and that the recirculation ratio of the flow rates of the saturated stream R to the supersaturated stream F is F/R=2, then the resulting supersaturation ratio of $S_{V-4A}$ in separator V-4A is:

$$\frac{FS_F + R}{F + R}$$

where F=2R since F/R=2 and $S_F=3$.

Thus by calculation:

$$S_{V-4A} = \frac{(2R \times 3) + R}{2R + R} = \frac{7}{3} R = 2.33$$

As will clearly appear, the supersaturation in flash pot 4 is reduced from 3 to 2⅓ as mixing occurs, and there will be less deposition on the walls of the separator vessel V-4A. In this vessel, the supersaturation is ultimately reduced to 1.0 (just saturated) by silica deposition on recirculated suspended solids and colloidal silica.

In order to achieve the desired dilution effect, a substantial portion of the slurry following flashing at the intermediate-temperature stage (V-4A) should be recycled. Thus, for example, if R/F is less than say 0.05, it is unlikely that the supersaturation will be reduced enough to reduce the rate of scaling. On the other hand, if the ratio is too large, the size of flash pot 4 and separator V-4A would have to be large and, therefore, expensive, which would thus offset the advantages of recirculation.

Preferably, the ratio of F/R should be about 0.05 to 2.0. An advantage of using a hold-tank 15 as shown in FIG. 2 is that it gives the silica in the slightly supersaturated solution time to equilibrate with precipitated silica and thus reduce supersaturation to zero. By having the hold-tank well insulated, heat loss is prevented.

Figure 3:
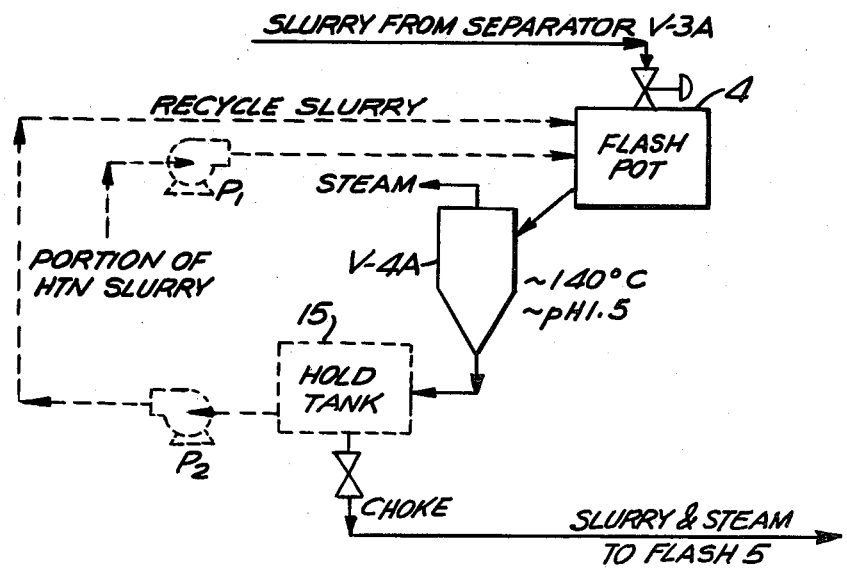
FIG. 3 is a portion of a leach flow sheet illustrating the use of high-temperature neutralization together with recycle slurry for controlling silica deposition on pressure let-down train surfaces.

It may be advantageous to employ the embodiment in FIG. 3 which is similar to FIG. 2 except that high-temperature neutralization slurry (HTN) is employed, such as garnierite, to neutralize the acid sufficiently to raise the pH to about 1.7. The addition of HTN to the intermediate-temperature stage should be carefully controlled so that the pH does not exceed about 2 or 3; otherwise scaling may be accelerated. Preferably, the pH should be controlled to a range of approximately 1 to 2. Alternatively, the HTN addition may be made to the high-temperature stage, the addition to the intermediate-temperature stage being preferred.

Referring to FIG. 3, the slurry from separator V-3A (shown in FIG. 2) flows to flash pot 4 at a temperature of about 200° C. and pH 0.8. During flashing, recycle slurry from hold-tank 15 is pumped via pump P₂ to flash pot 4 as a portion of HTN slurry is pumped thereto via pump P₁ as shown so that the diluted blend flowing into separator V-4A has a pH of about 1.5 and an intermediate temperature of about 140° C. Generally speaking, the temperature at the intermediate stage may range from 120° C. to 180° C., preferably about 135° C. to 165° C. Very little silica scaling occurs in the upstream flash system such that the 200° C. temperature upstream is high and close enough to the 270° C. leach temperature that there is insufficient supersaturation with respect to monomeric silica (i.e., Si(OH)₄). Without adequate supersaturation, the polymerization necessary to form fine silica colloid required for rapid scaling does not occur. Thus, the upstream high temperature capable of maintaining a relatively high supersaturation level of silica is generally in excess of 180° C. and may range from about 190° C. to 230° C.

While some silica scale may form during a third-stage flashing at 95° C., the rate of polymerization at said temperature is sufficiently slow so that the slurry can be sent on to CCD before substantial silica polymerization occurs. Thus, most of the silica deposition occurs at intermediate temperatures, which is hot enough to support rapid polymerization and yet cool enough to build up high silica supersaturation.

The use of HTN as a source of alkali to raise the pH is advantageous in that the intermediate temperature (e.g., 135° to 165° C.) should enable the leaching out of most of the residual nickel in the HTN material.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method for inhibiting the formation of silica scale on let-down train surfaces during the multi-stage flashing of sulfuric acid pressure leach slurry obtained following the continuous autoclave leaching of nickel lateritic ore at elevated temperature and pressure during which silica is dissolved, wherein said leach slurry is subjected to a high-temperature flash stage such that the slurry at said flash temperature is supersaturated in silica, and wherein said slurry is thereafter subjected to at least one additional flash at an intermediate-temperature flash stage at which silica precipitates and tends to form a scale accompanied by a decrease in said supersaturation, the improvement which comprises, recycling a substantial portion of the slurry to said intermediate-temperature stage following flashing to said intermediate-temperature flash stage, said portion recycled being sufficient to effect a dilution in soluble silica concentration and thereby decrease the supersaturation in the slurry flashed from a higher temperature fed to said intermediate-temperature flash stage, and continuing said multi-stage flashing and said recycling of said flashed slurry to said intermediate-temperature flash stage, whereby silica scale formation at the intermediate-temperature flash stage is greatly inhibited.

2. The method of claim 1, wherein during recycling of said slurry from the intermediate-temperature stage, the pH of the material in the intermediate-temperature stage is controlled to about 1 to 2 by adding thereto a nickel laterite ore capable of neutralizing a part of the acid in said intermediate-temperature stage.

3. The method of claim 1, wherein a nickel laterite ore is added to the high-temperature stage to control the pH thereof to about 1 to 2.

4. The method of claim 1, wherein the temperature at the intermediate-temperature stage ranges from about 120° to 180° C. and the temperature at the high-temperature stage ranges from about 190° to 230° C.

5. The method of claim 1, wherein the amount of supersaturation at the intermediate-temperature stage following recycling is determined by the following formula:

$$S_{IT} = \frac{(FS_F + R)}{(F + R)},$$

wherein:

$S_{IT}$ = supersaturation ratio following recycling at the intermediate temperature;

F = the mass flow rate of the stream of supersaturated silica entering the intermediate-temperature stage;

$S_F$ = the supersaturation ratio of soluble silica in the stream being flashed from the high-temperature stage to the intermediate-temperature stage;

R = the recirculation flow rate;

and wherein F/R ranges from about 0.5 to 2.

6. In a method for inhibiting the formation of silica scale on flash-pot surfaces during the multi-stage flashing of sulfuric acid pressure leach slurry obtained following the continuous autoclave leaching of nickel lateritic ore at elevated temperature and pressure during which silica is dissolved, wherein said leach slurry is subjected to a high-temperature flash stage from a higher temperature down to about 190° C. to 230° C. such that the slurry at said flash temperature of about 190° C. to 230° C. is supersaturated in silica, and wherein said slurry is thereafter subjected to at least one additional flash to an intermediate-temperature flash stage in the range of about 120° C. to 180° C. at which silica precipitates and tends to form a scale accompanied by a decrease in said supersaturation, the improvement which comprises, recycling a substantial portion of the slurry to said intermediate-temperature stage following flashing to said intermediate-temperature flash stage while feeding a nickel laterite ore thereto to neutralize part of the acid in said intermediate-temperature stage and control the pH thereof to about 1 to 2, said portion recycled being sufficient to effect a dilution in the soluble silica concentration and thereby decrease the superesaturation in the slurry fed from the high temperature to said intermediate-temperature flash stage, and continuing said multi-stage flashing and said recycling of said flashed slurry to said intermediate-temperature flash stage, whereby silica scale formation at the intermediate-temperature flash stage is greatly inhibited.

7. The method of claim 6, wherein the recycle slurry is held in a hold-tank to allow it to equilibrate prior to recycling it to said intermediate-temperature flash stage.

8. The method of claim 6, wherein the amount of supersaturation at the intermediate-temperature stage is determined by the following formula:

$$S_{IT} = \frac{(FS_F + R)}{(F + R)},$$

wherein:

$S_{IT}$ = supersaturation ratio at the intermediate temperature;

F = the mass flow rate of the stream of supersaturated silica entering the intermediate-temperature stage;

$S_F$ = the supersaturation ratio of soluble silica in the stream being flashed from the high-temperature stage to the intermediate-temperature stage;

R = the recirculation flow rate;

and wherein F/R ranges from about 0.5 to 2.

9. In a method for inhibiting the formation of silica scale on flash-pot surfaces during the multi-stage flashing of sulfuric acid pressure leach slurry obtained following the continuous autoclave leaching of nickel lateritic ore at elevated temperature and pressure during which silica is dissolved, wherein said leach slurry is subjected to a high-temperature flash stage in the range of about 190° C. to 230° C. such that the slurry at said flash temperature is supersaturated in silica, and wherein said slurry is thereafter subjected to at least one additional flash at an intermediate-temperature flash stage in the range of about 120° C. to 180° C. at which silica precipitates and tends to form a scale accompanied by a decrease in said supersaturation, the improvement which comprises, recycling a substantial portion of the slurry to said intermediate-temperature stage following flashing to said intermediate-temperature flash stage, said portion recycled being sufficient to effect a dilution in soluble silica concentration of the slurry fed to said intermediate-temperature flash stage from the higher temperature stage, the amount of supersaturation after recycling to said intermediate-temperature stage being determined by the following formula:

$$S_{IT} = \frac{(FS_F + R)}{(F + R)},$$

wherein:

$S_{IT}$ = supersaturation ratio at the intermediate temperature;

F = the mass flow rate of the stream of supersaturated silica entering the high-temperature stage;

$S_F$ = the supersaturation ratio of soluble silica in the stream being flashed from the high-temperature stage to the intermediate-temperature stage;

R = the recirculation flow rate;

and wherein F/R ranges from about 0.5 to 2, and continuing said multi-stage flashing and said recycling of said flashed slurry to said intermediate-temperature flash stage, whereby silica scale formation at the intermediate-temperature flash stage is greatly inhibited.

10. The method of claim 9, wherein the recycle slurry is held in a hold-tank to allow it to equlibrate prior to recycling it to said intermediate-temperature flash stage.

* * * * *